US006937627B2

(12) United States Patent
Lin

(10) Patent No.: US 6,937,627 B2
(45) Date of Patent: Aug. 30, 2005

(54) STABLE AND HIGH SPEED FULL RANGE LASER WAVELENGTH TUNING WITH REDUCED GROUP DELAY AND TEMPERATURE VARIATION COMPENSATION

(76) Inventor: Jian Lin, 1773 Karameos CT, Sunnyvale, CA (US) 94087

(*) Notice: Subject to any disclaimer, the term of this patent is extended or adjusted under 35 U.S.C. 154(b) by 0 days.

(21) Appl. No.: 10/337,081

(22) Filed: Jan. 6, 2003

(65) Prior Publication Data

US 2003/0133477 A1 Jul. 17, 2003

Related U.S. Application Data

(60) Provisional application No. 60/346,269, filed on Jan. 5, 2002, provisional application No. 60/346,270, filed on Jan. 5, 2002, and provisional application No. 60/346,271, filed on Jan. 5, 2002.

(51) Int. Cl.$^{7}$ .............................. H01S 3/30; H01S 3/10; H01S 3/083

(52) U.S. Cl. ................................ 372/6; 372/94; 372/20

(58) Field of Search ................................ 372/6, 19, 20, 372/94, 102, 6.2, 32

(56) References Cited

U.S. PATENT DOCUMENTS 1,926 A * 1/1841 Carruthers et al. ........... 432/97
5,513,194 A * 4/1996 Tamura et al. ................. 372/6
5,956,355 A * 9/1999 Swanson et al. .............. 372/20
6,160,826 A * 12/2000 Swanson et al. .............. 372/20
6,330,254 B1 * 12/2001 Hung .......................... 372/20
6,330,255 B1 * 12/2001 Hung .......................... 372/20
6,449,047 B1 * 9/2002 Bao et al. ................... 356/478
6,570,893 B1 * 5/2003 Libatique et al. ............. 372/20
6,606,331 B2 * 8/2003 Sousa et al. .................. 372/32
6,643,060 B2 * 11/2003 Hashimoto et al. ......... 359/346
6,674,773 B1 * 1/2004 Cotteverte et al. ............. 372/6

* cited by examiner

*Primary Examiner*—Don Wong
*Assistant Examiner*—Hung Tran Vy
(74) *Attorney, Agent, or Firm*—Bo-In Lin

(57) ABSTRACT

A fiber-based ring cavity tunable laser is disclosed in this invention that has full range high speed tuning achieved by combining a optical tunable filter with a period comb-shaped filter with central wavelengths anchored on International Telecommunication Union (ITU) grids. By using segments of dispersion managed fibers with predefined segment lengths the group delay differences are also reduced. The temperature sensitivity of optical transmission is also reduced by arranging the longitudinal axis of different segments of the optical fibers to orient with a relative angular difference, e.g., with an angular difference of ninety degrees.

31 Claims, 7 Drawing Sheets

STABLE AND HIGH SPEED FULL RANGE LASER WAVELENGTH TUNING WITH REDUCED GROUP DELAY AND TEMPERATURE VARIATION COMPENSATION

This Formal Application claims a Priority Date of Jan. 5, 2002 benefited from three Provisional Application Nos. 60/346,269, 60/346,270, and 60/346,271, filed by the same Applicant of this Application on Jan. 5, 2002.

FIELD OF THE INVENTION

The present invention relates generally to apparatuses and method for providing tunable laser source for optical fiber signal communication systems. More particularly, this invention relates to new configurations and methods for providing stable tunable laser source that is tunable at higher speed, having broader tuning ranges with reduced group delays and less fluctuations resulting from temperature variations.

BACKGROUND OF THE INVENTION

Conventional technologies of optical fiber communication networks are still confronted with several technical challenges and difficulties to achieve high speed full range wavelength tuning while maintaining wavelength and phase stability as the optical transmissions encounter wavelength dispersions over long distance transmission and operated over greater ranges of temperature fluctuations. There is an ever-urgent demand to resolve these limitations and difficulties. Specifically, in fiber telecommunications, tunable lasers are essential to provide system reconfiguration and reprogramming. Future applications may also require a laser with a higher power to compensate the components losses and a narrower line width to battle with chromatic dispersion. A fiber laser can potentially meet all these requirements. By integrating a tunable filter inside the cavity, the lasing wavelength can be tuned over the range of the tunable filter. However, conventional techniques for such wavelength tunings are still limited by a lower achievable tuning speed not compatible with the requirements of the next generation fiber telecommunication applications.

To achieve a full range wavelength tuning in C and/or L band, the laser suppliers in optical fiber telecommunication are confronted with another technical difficulty of maintaining laser stability while tuning the wavelength. In a fiber laser, the wavelength is tuned with an optical tunable filter (OTF). As the group delay varies with the wavelength in the fiber laser, tuning of wavelength will cause a change of the equivalent cavity length and that in turn causes the instability of the fiber laser. Therefore, the fiber length needs to be controlled by using either a PZT drum with fiber winded on it or a delay line. The speed of tuning and locking a fiber laser is controlled by both the speed of an electronically tunable filter and the speed of fiber length modulation apparatus. However, as the group-delay difference between two tuning wavelengths is increased, the corresponding fiber length adjustment has to increase also and that leads to a reduced tuning speed. For example, an SMF 28 has a maximum group delay difference of 570 ps/km between 1530 nm and 1565 nm (corresponding to relative effective index change of $4\times10^{-6}$/nm). The maximum relative displacement for a PZT fiber length modulator can only reach to $5\times10^{-5}$. So, the maximum wavelength tuning range is limited to be $5\times10^{-5}/4\times10^{-6}$ nm=12 nm. Even though a delay line can be used instead, but the tuning speed is usually limited with the driving motor and not practical for a mode locked fiber laser. For the purpose of achieving a full range of wavelength tuning with a PZT drum, a person of ordinary skill in the art is faced with a challenge to keep the maximum normalized group delay difference below 200 ps/km in order to achieve high speed wavelength tuning while maintaining laser stability.

Furthermore, a fiber telecommunication system is operated under conditions with broad ranges of temperature variations. As the temperature changes, the light path variations induced by temperature variations within the fiber cavity will again cause the instability of the laser operation and degrade the laser performance.

Therefore, a need still exists in the art of optical fiber system and component manufacturing and design to provide new and improved system and component configurations and designs to overcome the above-mentioned technical difficulties and limitations.

SUMMARY OF THE PRESENT INVENTION

It is therefore an object of the present invention to provide a tunable laser implemented as a fiber-based ring cavity that can achieve full range high speed tuning operated with wavelength stability with reduced group delay and temperature-dependent fluctuations such that the above mentioned limitations and difficulties can be resolved.

Specifically, it is an object of the present invention to provide a tunable laser implemented as a fiber-based ring cavity operated with tunable filter combined with a periodic filter with central wavelengths anchored to the ITU grids to achieve full range high speed wavelength tunings.

Another object of the present invention is to provide a tunable laser implemented as a fiber-based ring cavity implemented with dispersion compensation fibers (DCF) of different lengths to reduced the difference between group delays when tuning the laser wavelengths such that high speed tuning may further enhanced.

Another object of the present invention is to provide a new type of fiber connection configurations by arranging the longitudinal axes of two fibers with a predefined angular difference such that the temperature induced phase changes can be minimized and wavelength stability of a tunable laser implemented with a fiber-based ring cavity can be further improved.

Briefly, in a preferred embodiment, the present invention discloses a fiber-based ring cavity tunable laser. This tunable laser includes an optical tunable filter (OTF) for tuning a central wavelength of the tunable laser. The tunable laser further includes a periodic filter having periodic central wavelengths anchoring on an International Telecommunication Union (ITU) grid. The tunable laser is implemented with an erbium-doped fiber as a gain medium constituting a fiber-based ring.

In a preferred embodiment, this invention further discloses a fiber-based ring cavity tunable laser that includes an optical tunable fiber (OTF) for tuning a central wavelength of the tunable laser. This tunable laser further includes a fiber-based ring comprising a dispersion compensation fiber (DCF) having a first segment connected to a first end of the OTF and a second segment connected to a second end of the OTF opposite the first end of the OTF. The first segment and second segments having different lengths for reducing a group delay difference of an optical transmission.

In another preferred embodiment, this invention further discloses a fiber-based ring cavity tunable laser that includes a fiber-based ring having at least a first and a second segments wherein the first segment having a first longitudinal axis and second segment having a second longitudinal axis wherein the first and second longitudinal axes are oriented with an angular difference. In a preferred embodiment, the fiber-based ring comprising a polarization maintaining fiber. In another preferred embodiment, the first and second longitudinal axes are oriented with an angular difference of ninety degrees.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1A:
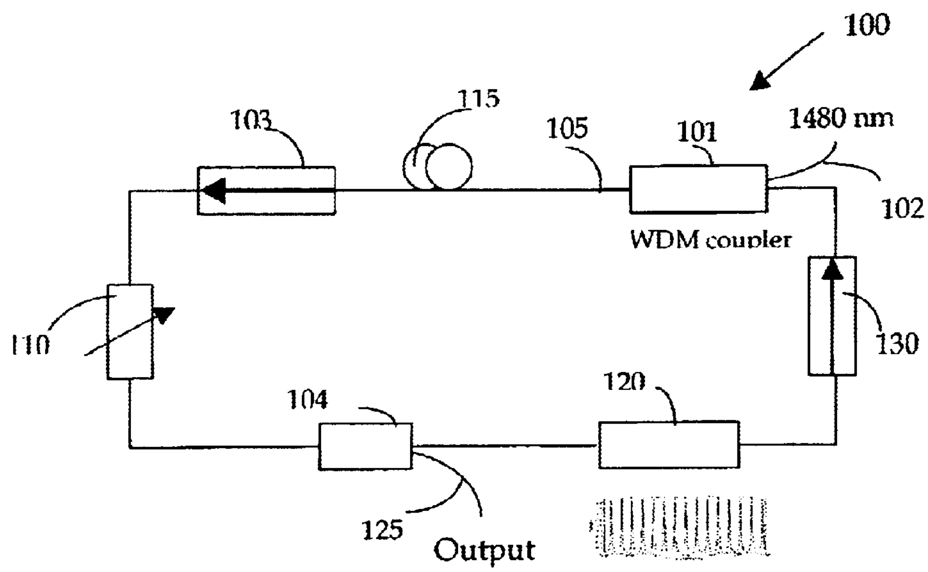
FIG. 1A is a schematic functional block diagram for showing an electronically tunable fiber laser of this invention.

Referring to FIG. 1A for a specialty fiber based ring cavity 100. The fiber based ring cavity 100 includes an electro-optical tunable filter 110 to achieve a high speed wavelength laser tuning. A specialty fiber 105 is used in the cavity to provide a way of confining the light while maintaining the polarization. A polarization maintaining Erbium-doped fiber (PMEDF) 115 is used in the cavity as a gain medium and to avoid lasing instability due to polarization change in the laser cavity. The fiber based ring cavity 100 further includes a periodic filter 120 to generate a spectral comb response. This comb FP filter 120 has a high finesse with a bandwidth close to the narrow line width of the fiber laser and a free spectral range of 100 GHz or 50 GHz. The center wavelengths of the filter are anchored with the International Telecommunication Union (ITU) grids such that the lasing wavelength is matched with the telecommunications standards. The electronically tunable filter 110 is applied to tune the center wavelength of the laser. The combination effect of the two filters, i.e., filters 110 and 120, can eliminate the mode hopping and provide a very narrow line width operation. A dual pigtail wavelength division multiplexing (WDM) coupler 101 is implemented to receive an input optical signal 102, e.g., a 1480 nm signal as shown. The input optical signal is amplified by the PMEDF 115 then transmitted through an isolator 103. The wavelength is tuned by the optical tunable filter 110 and projected through a second coupler 104 and reflected back by the periodic filter 120 for outputting through an output fiber 125 of the coupler 104. Another insulator 130 is connected between the periodic filter 120 and the first coupler 101 for completing the fiber based ring cavity for generating an amplified wavelength-tuned optical signal anchored at the ITU grids. In a preferred embodiment, the comb filter 120 that is implemented to anchor the laser wavelengths to the ITU channels is a Fabry-Perot (FP) cavity with high reflection coatings to achieve the required performance as will be further described below.

Figure 1B:
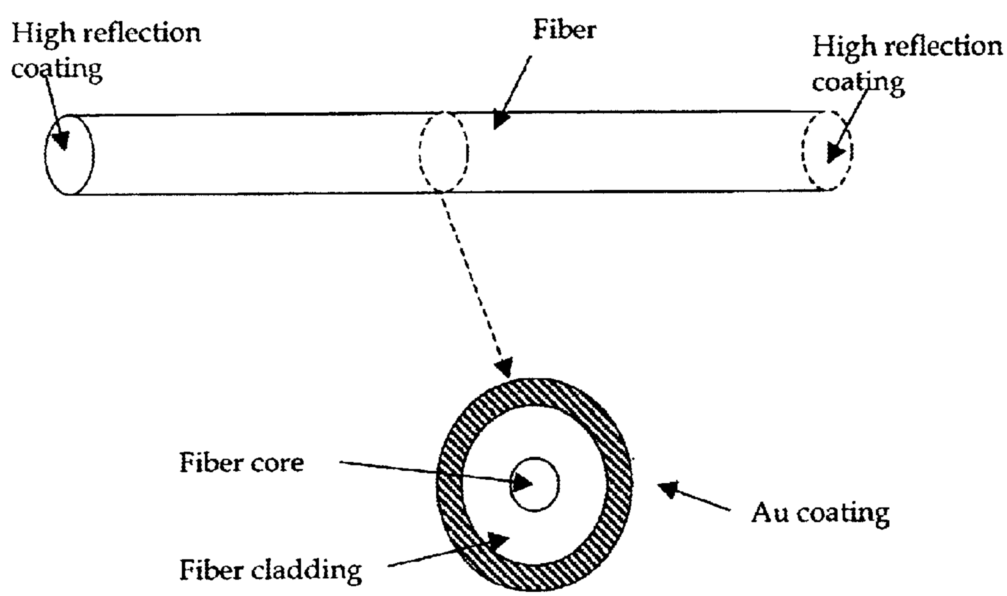
FIG. 1B shows a fiber-based Fabry-Perot filter for generating a comb-shaped spectra of optical transmission.

In a preferred embodiment, the comb filter 120 in the invention can be a fiber cavity built on an EDF or a transmission fiber. High reflection coating is deposited on both ends of the fiber to form a FP cavity based filter in the fiber. A thin film of gold (Au) is coated on the cladding of the fiber to finely tune the transmission peak by heating the fiber to change the effective refractive index. A schematic diagram of the filter 120 is shown in FIG. 1B. The transmission spectra of the filter is represented by $$T(\phi) = \frac{(1-R_1)(1-R_2)}{\left(1-\sqrt{R_1R_2}\right)^2 + 4\sqrt{R_1R_2}\sin^2(\phi)}, \tag{1}$$

where R1 and R2 are the reflectance of the two end surfaces of the fiber and $$\phi = \frac{\omega nl}{c} = \frac{2\pi \nu nl}{c} = \frac{2\pi nl}{\lambda}. \tag{2}$$

The 3-dB bandwidth of the filter can be represented as:

$$\Delta\nu_{\frac{1}{2}} = \frac{c}{2nd}\left\{\frac{1-\sqrt{R_1R_2}}{\pi(R_1R_2)^{\frac{1}{4}}}\right\}. \tag{3}$$

Figure 1C:
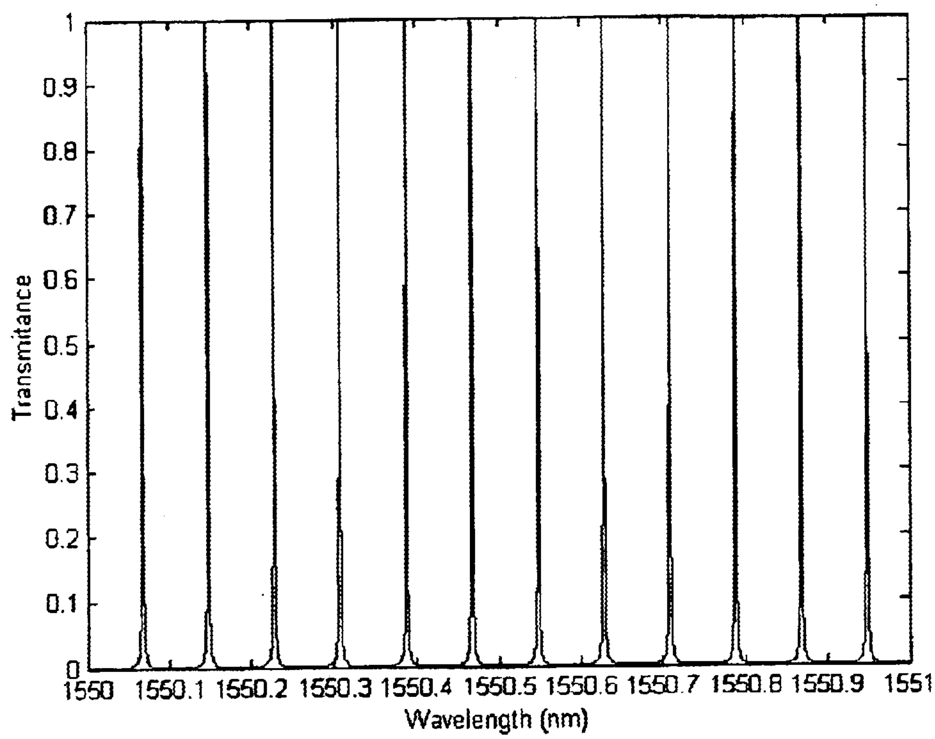
FIG. 1C show the spectra of an optical transmission generated by a comb FP fiber-based filter shown in FIG. 1B.

FIG. 1C shows the analytical results for a cavity length of 20 mm and reflectance of 0.9 used in the analyses. The fiber based FP cavity provides a good confinement of light in the cavity and spectra with extremely narrow free spectral range.

Unlike the conventional tunable thin film filter or bulk grating to tune the wavelength of the laser by using a stepping motor that has a limited tuning speed. Due to the speed limitations of the step motor, the conventional filter is difficult to achieve a tuning speed in tens of milliseconds. In order of achieving higher tuning speed, four alternate embodiments are implemented in this invention. These four different embodiments can be generally divided into two general categories. These two categories are Fabry-Perot (FP) tunable filters and acousto-optical filters.

Figure 2:
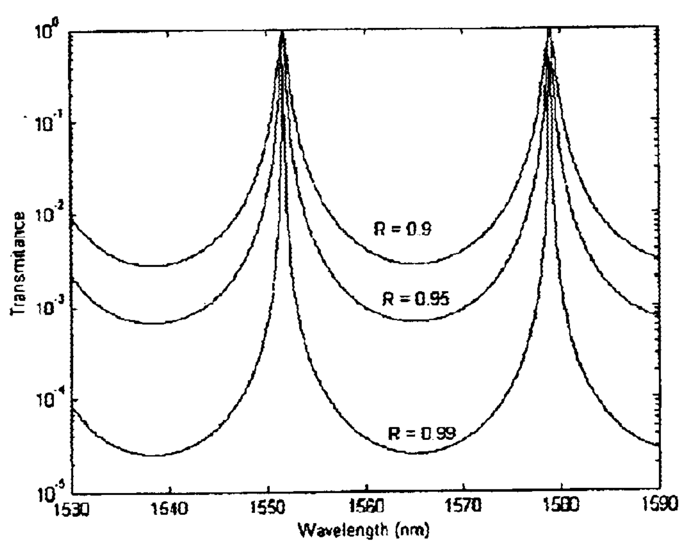
FIG. 2 is diagram for showing the spectra of a Fabry-Perot filter with different reflectance.

A FP tunable filter (FPTF) usually consists of two parallel mirrors having certain reflectance to control its Finesse and bandwidth (BW). The free spectral range (FSR) is determined with the spacing between the two parallel mirrors. FIG. 2 shows a simulation result for a cavity spaced 30 μm with different coating reflectance. By changing the spacing between the two mirrors, the center wavelength can be tuned over the spectral region interested. As shown in FIG. 1A, a second isolator 130 is added between tunable filter 120 and PM EDF modulator 115 to eliminate the effects of back-reflection of Fabry-Perot tunable filters.

Figure 3:
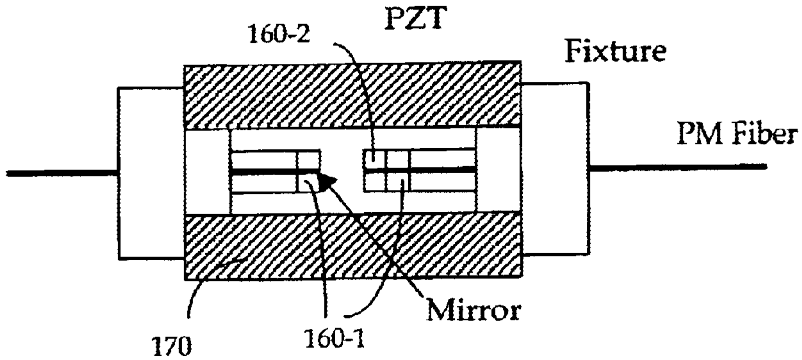
FIG. 3 is schematic diagram for showing a Fabry-Perot tunable filter implemented with a PZT actuator.

The spacing of a FP filter can be changed either by varying the physical distance of the mirrors or the refractive index of the material in the cavity. For the former approach, a PZT actuator or micro electro mechanical system (MEMS) can be used to tune the mirror spacing. An exemplary embodiment of FP tunable filter 120-1 is shown in FIG. 3 that is marketed by Micron Optics, Inc, Atlanta, Ga. A PZT actuator 170 controls the distance between two mirrors 160-1 and 160-2. The tuning speed is limited with that of the PZT actuator 170 that usually can be tuned as fast as milliseconds.

Figure 4:
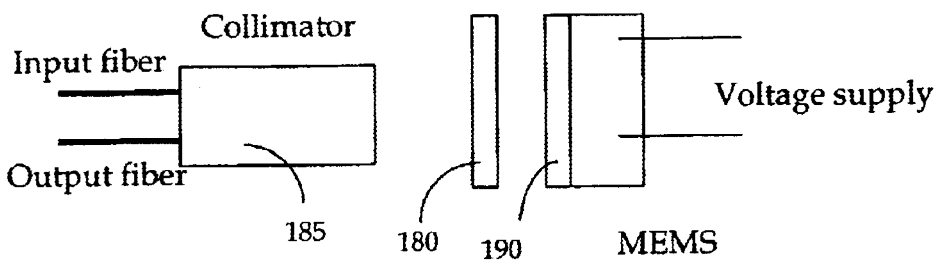
FIG. 4 is schematic diagram for showing a Fabry-Perot tunable filter implemented with a MEM dielectric mirror manufactured with the micro-electromechanical (MEM) technology.

FIG. 4 shows a functional diagram of another embodiment where a tunable FP filter is implemented by applying a micro electromechanical (MEM) technology for manufacturing dielectric reflection mirror 180 disposed between a dual fiber collimator 185 and an electrode 190. The thin film manufactured with MEM technology is a reflection type, i.e., a reflection mirror 180; a dual-fiber collimator is employed to separate input and output. Applying different voltages on the MEM-manufactured electrodes 190 the distance of the FP cavity is changed and the wavelength is tuned.

Figure 5:
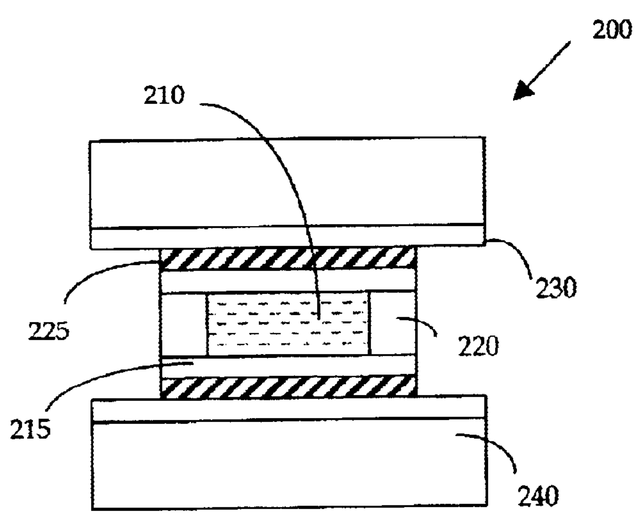
FIG. 5 is schematic diagram for showing a Fabry-Perot tunable filter implemented with a liquid crystal (LC) with tunable refraction index.

FIG. 5 shows another embodiment of FP filter 200 supported on a glass substrate 240 where the Fabry-Perot cavity is filled with liquid crystal 210 surrounded and defined by spacer 220 and supported on a polymer alignment layer 215 overlaid by a dielectric reflection layer 225 for reflecting optical signals back to the FP cavity 210. By applying and controlling the voltage applied to the transparent conductive layer 230, the refraction index of the liquid crystal 210 is changed accordingly and the central wavelength is tuned. Similar to the PZT tunable filter shown in FIG. 4, this liquid crystal FP tunable filter can achieve a tuning speed in the range of milliseconds.

Figure 6:
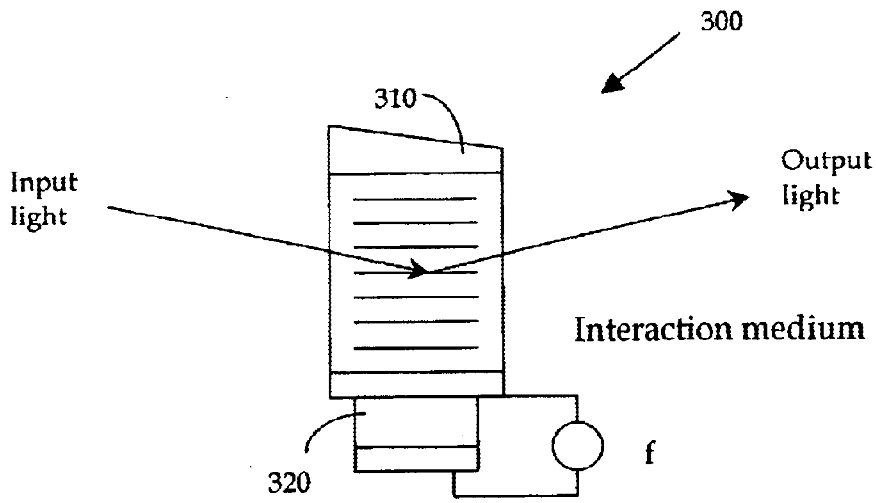
FIG. 6 is schematic diagram for showing a acousto-optical tunable filter applicable to the AML fiber laser (AMLFL) of this invention.

Referring to FIG. 6 for a category-2 tunable filter implemented as an Acousto-Optical (AO) Tunable Filter (AOTF) 300. This acousto-optical tunable filter (AOTF) applicable to the AMLFL consists of a Tellurium dioxide bulk material 310 in conjunction with an RF-driven transducer 320 to generate an acoustic grating in the material. By changing the RF frequency to drive the RF-driven transducer 320, corresponding to change of the grating period in the acoustic absorber 310 composed of Tellurium dioxide bulk material, the wavelength can be tuned because of the shift of the corresponding Bragg diffraction angle. The tuning speed can be as fast as tens of microseconds (μs).

These four types of filters as shown in FIGS. 3 to 6, can be polarization maintaining or polarization independent in principle. Their bandwidths can be designed to meet the pulse width requirement of the laser. In practice, AOTP and LC-FPTF are more favor of polarization maintaining.

In addition to the improvement of tuning speed as described above, this invention further discloses method and techniques to reduce the maximum group delay difference by either using a specialty fiber or combining various fibers with different group delay properties. Special techniques are disclosed by configuring the laser cavity using different combinations of fibers for group delay reductions. According to the techniques as will be further described below, the new and improved laser tuning device not only enables a person of ordinary skill to meet the requirement of wavelength tuning range, there are further improvements in the tuning speed. For example, when a maximum normalized group delay difference of 20 ps/km is achieved in this invention that is about ten times smaller than the required group delay difference, this will reduce the tuning voltage range of the PZT drum by approximately ten times at the same slew rate. This in turn will significantly increase the speed of both wavelength tuning and mode locking of the laser.

Figure 7:
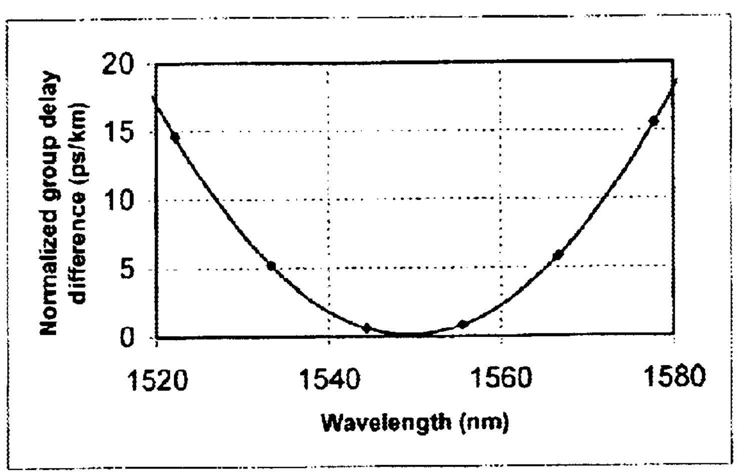
FIG. 7 is a diagram showing the simulation results of the normalized group delay difference between two fibers.
Figure 8A:
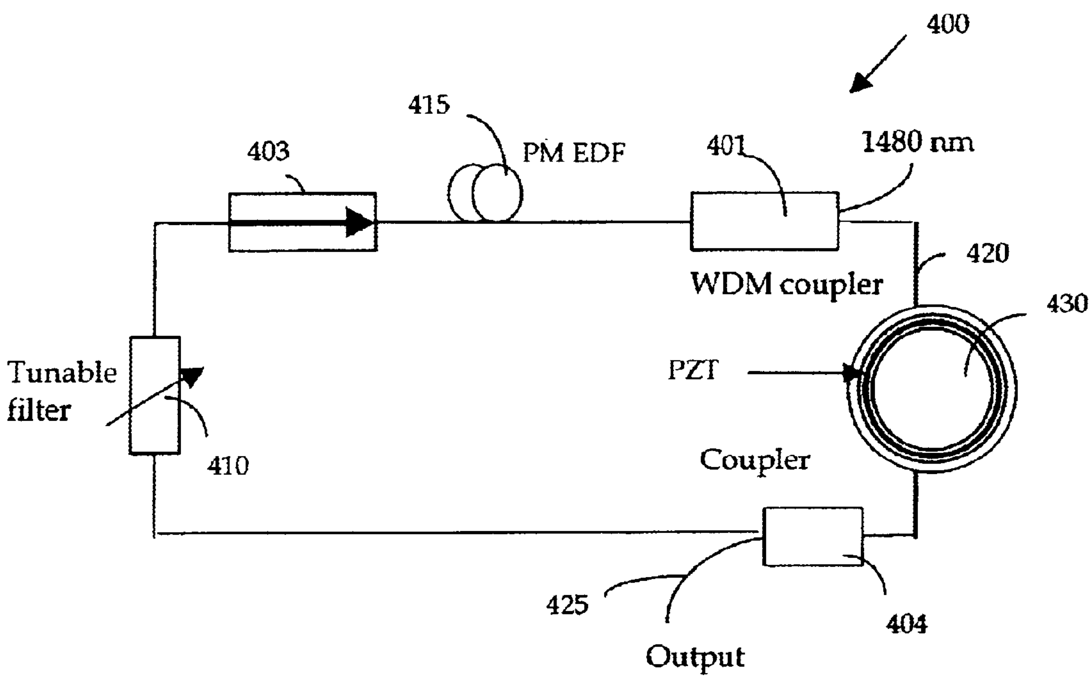
FIG. 8A is a schematic diagram of a fiber ring laser with feedback control of PZT group-delay compensator of this invention.

FIG. 7 shows a simulated result of an example for a combination of an SMF 28 and a dispersion compensation fiber (DCF). The DCF 415 used here as shown in FIG. 8A can be a piece of Erbium doped fiber (EDF) 415. By carefully selecting the length of the two fibers, the maximum normalized group delay difference can be well controlled within 20 ps/km. With this new combination of DCF compensation fiber, a ring cavity laser using 20 meters of PM EDF 415 and 40 meters of Panda PM fiber 420 is formed as shown in FIG. 8A. A PZT 430 is used to wind fiber on to modulate the fiber length for compensation of both temperature and wavelength change. Similar to a fiber-based ring cavity show in FIG. 1A, a polarization maintaining Erbium-doped fiber (PMEDF) 415 is used in the cavity as a gain medium and to avoid lasing instability due to polarization change in the laser ring cavity 400. The fiber based ring cavity 400 further includes an optically tunable filter (OTF) 410. The optically tunable filter 410 is applied to tune the center wavelength of the laser and the fiber based FP optical tunable filter (OTF) has a 3 dB bandwidth of 0.4 nm with the PZT 430 to tune the cavity. A dual pigtail WDM, i.e., wavelength division multiplexing, coupler 401 is implemented to receive an input optical signal 402, e.g., a 1480 nm signal as shown. The input optical signal is amplified by the PMEDF 415 then transmitted through an isolator 403. The wavelength is tuned by the optical tunable filter 410 and projected through a second coupler 404 for outputting through an output fiber 425 of the coupler 404.

Figure 8B:
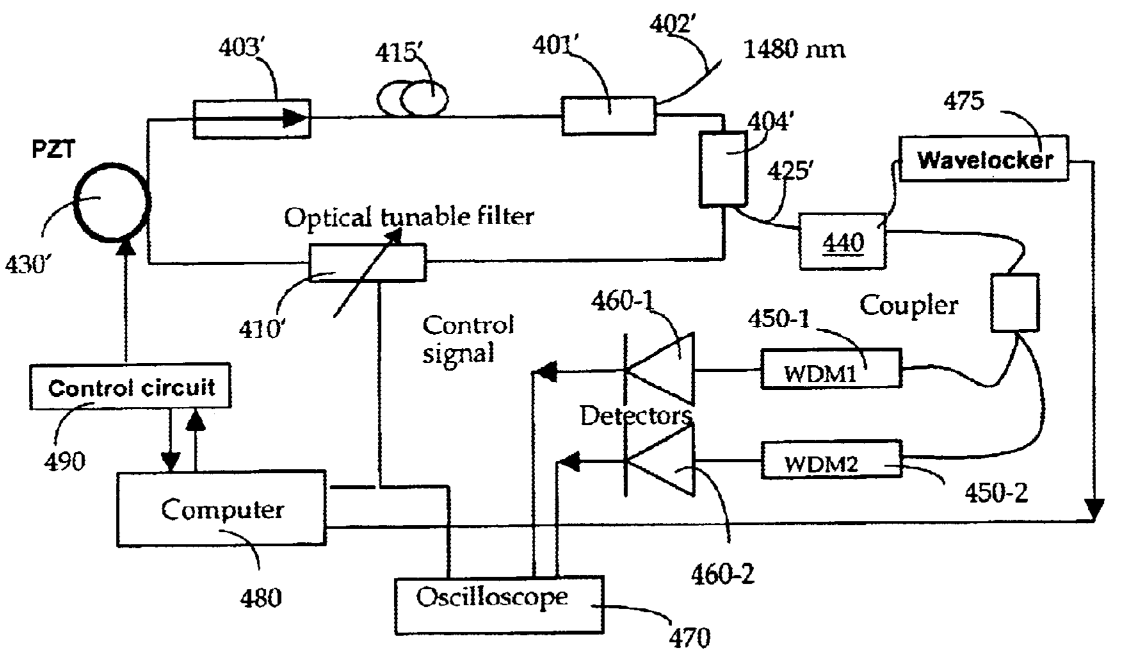
FIG. 8B is a functional block diagram of a ring laser as an alternate preferred embodiment of this invention.

FIG. 8B shows another preferred embodiment of a ring laser 400' similar to that shown in FIG. 8A aided with feedback control of the PZT 430'. A tap 440 is used to couple part of the output light to two 100 GHz channel spacing WDM Demux (1530 nm and 1560 nm) 450-1 and 450-2 followed by two detectors 460-1, and 460-2 to measure with an oscilloscope 470 the settling time of the tunable fiber laser. The measurements obtained by the oscilloscope 470 are inputted to a computer 480. The computer 480 further receives input signals from a wave-locker 475 to function as a controller for generating signals to control circuit 490 to control the PAT 430.

Figure 9:
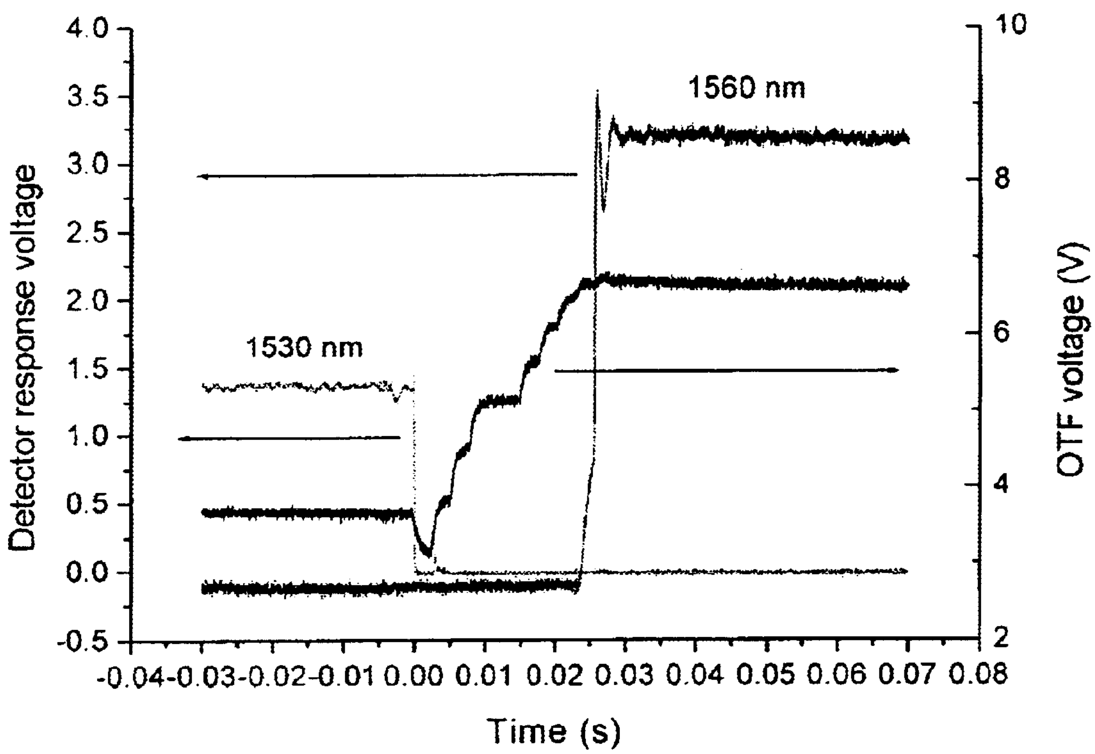
FIG. 9 shows the measured response voltage over time for illustrating the settling time when tuning the wavelength.

Based on the laser cavity requirement as disclosed in FIGS. 1 and 8; other types of fibers may also be used to obtain similar performance. Non-polarization maintenance (PM) fiber may be an option. It can also apply to Thulium doped fiber (TDF) to cover S-band from 1450–1510 nm, Pr-doped fiber (PDF) in 1300 nm band, and Raman pumped fiber laser. This approach applies to both PM fiber based fiber laser and non-PM fiber based fiber laser. FIG. 9 shows the switching and settling time when the channel is tuned from 1530 nm to 1560 nm. After 30 ms of switching the OTF voltage, the wavelength at 1560 is locked and stable.

Similar to that shown in FIG. 1A, this tunable laser 400 can further includes a periodic filter (not shown) to generate a spectral comb response that has to a high finesse with a bandwidth close to the narrow line width of the fiber laser and a free spectral range of 100 GHz or 50 GHz. The center wavelengths of the filter are anchored with ITU grids such that the lasing wavelength is matched with the telecommunications standards. The combination effect of the two filters, i.e., filters 410 and the periodic filter as that shown in FIG. 1A, can eliminate the mode hopping and provide a very narrow line width operation. Another insulator (not shown) can be connected between the periodic filter and the first coupler 401 for completing the fiber based ring cavity for generating an amplified wavelength-tuned optical signal anchored at the ITU grids.

Figure 10:
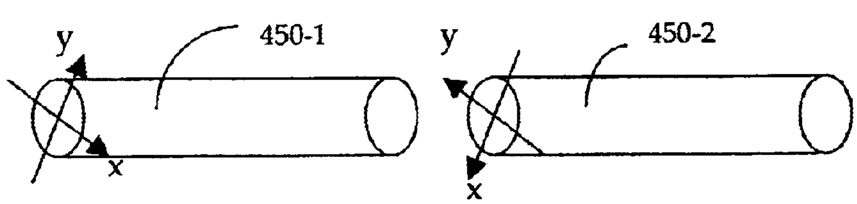
FIG. 10 shows an arrangement of the polarization maintaining (PM) fiber for temperature compensation.

For the purpose of improving the laser tuning performance, this invention further discloses a method to reduce the temperature induced phase changes. Specifically, when a polarization maintaining (PM) fibers are used in forming the laser cavity in a ring fiber laser, a novel technique is implemented to achieve the reduction in sensitivity of the temperature-induced phase variations. As that shown in FIG. 10, an operation is carried out by cutting the PM fiber in half and rotating their longitudinal axes relative to each other by 90 degrees, the temperature induced phase change can be compensated. More specifically, FIG. 10 shows the schematic diagram for the arrangement of the fiber rotation. The Pm fiber 450 used here can be a piece of any type of PM fiber in a fiber laser cavity. The fiber 450 is cut in half 450-1 and 450-2 with identical lengths. Then one of the fiber 450-2 is rotated 90 degrees to make one of the fiber's slow axis aligned with the fast axis of the other half and splice them. The effect of temperature on the PM fiber is similar to the effect induced by pressure or strain. The effective refractive index will change differently between fast and slow axes. The corresponding changes of group delays (phases) will change accordingly. By using the invention, the corresponding phases changes can be automatically compensated in a simple way. This method can be used in combination with other methods, such as delay lines, winded fiber on PZT drum; to efficiently compensate the temperature induced phase change in the fiber laser cavity.

Based on above descriptions and drawings, this invention discloses a fiber-based ring cavity tunable laser that includes an optical tunable filter (OTF) for tuning a central wavelength of the tunable laser. The tunable laser further includes a periodic filter having periodic central wavelengths anchoring on an International Telecommunication Union (ITU) grid. The tunable laser further includes an erbium-doped fiber as a gain medium constituting a fiber-based ring. In another preferred embodiment, the tunable laser further includes a transmission optical fiber constituting a fiber-based ring. In another preferred embodiment, the erbium-doped fiber is a polarization maintaining fiber. In another preferred embodiment, the erbium-doped fiber is a non-polarization maintaining fiber. In another preferred embodiment, the periodic filter constituting a comb-shaped spectrum wavelength filter. In another preferred embodiment, the periodic filter having a 3 dB bandwidth of transmission spectra ranging from a few KHz to 20 GHz. In another preferred embodiment, the periodic filter having a bandwidth approximating a line-width of the fiber-based ring cavity tunable laser. In another preferred embodiment, the periodic filter having a spectral range of 10 GHz to 500 GHz. In another preferred embodiment, the periodic filter comprising a fiber cavity. In another preferred embodiment, the periodic filter comprising a fiber-cavity having a first end and a second end wherein each of the first and second ends coated with a reflection coating. In another preferred embodiment, the periodic filter comprising a fiber-cavity having a cladding coated with a gold coating. In another preferred embodiment, the periodic filter comprising a fiber-cavity having a fiber length ranging from a few millimeters to a few meters. In another preferred embodiment, the optical tunable filter (OTF) is an electrically tunable optical filter. In another preferred embodiment, the optical tunable filter (OTF) is an acoustically tunable optical filter. In another preferred embodiment, the optical tunable filter (OTF) is an Fabry-Perot tunable optical filter. In another preferred embodiment, the optical tunable filter (OTF) is a filter manufactured by a micro electromechanical (MEM) process. In another preferred embodiment, the optical tunable filter (OTF) comprising a PZT actuator. In another preferred embodiment, the optical tunable filter (OTF) comprising a refraction-index tunable liquid crystal. In another preferred embodiment, the optical tunable filter (OTF) comprising a acoustic tunable tellurium dioxide. In another preferred embodiment, the optical tunable filter (OTF) comprising a acoustic tunable tellurium dioxide and an radio frequency (RF) driven transducer. In another preferred embodiment, the optical tunable filter (OTF) having a tunable speed ranging between one-hundred milliseconds (100 ms) to one-tenth millisecond (0.1 ms). In another preferred embodiment, the fiber-based ring comprising a dispersion managed cavity. In another preferred embodiment, the fiber-based ring comprising a erbium-doped dispersion compensation fiber (DCF). In another preferred embodiment, the fiber-based ring comprising a dispersion compensation fiber (DCF) having a first segment connected to a first end of the OTF and a second segment connected to a second end of the OTF opposite the first end of the OTF wherein the first segment and second segment having different lengths for reducing a group delay difference of an optical transmission. In another preferred embodiment, the fiber-based ring comprising a dispersion compensation fiber (DCF) and a PZT actuator for adjusting a length of the DCF for reducing a group delay difference of an optical transmission. In another preferred embodiment, the fiber-based ring comprising a dispersion compensation fiber (DCF) having a first segment connected to a first end of the OTF and a second segment connected to a second end of the OTF opposite the first end of the OTF wherein the first segment and second segment having different lengths for reducing a group delay difference of an optical transmission. The first segment having a first longitudinal axis and second segment having a second longitudinal axis wherein the first and second longitudinal axes are oriented with an angular difference.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A fiber-based ring cavity tunable laser comprising an optical fiber formed as a ring for receiving a laser projection therein comprising:

an optical tunable filter (OTF) for tuning a central wavelength of said tunable laser; and a periodic filter connected by said optical fiber to said OTF, wherein said periodic filter further comprising a fiber segment having a high-reflection coating disposed on both end surfaces wherein said segment is wrapped by a gold coating around a fiber cladding for providing a filtering spectrum with periodic central wavelengths anchoring on an International Telecommunication Union (ITU) grid.

2. The fiber-based ring cavity tunable laser of claim 1 further comprising:

an erbium-doped fiber as a gain medium constituting a fiber-based ring.

3. The fiber-based ring cavity tunable laser of claim 2 wherein:

said erbium-doped fiber is a polarization maintaining fiber.

4. The fiber-based ring cavity tunable laser of claim 2 wherein:

said erbium-doped fiber is a non-polarization maintaining fiber.

5. The fiber-based ring cavity tunable laser of claim 1 wherein:

said periodic filter constituting a comb-shaped spectrum wavelength filter.

6. The fiber-based ring cavity tunable laser of claim 1 wherein:

said periodic filter having a 3 dB bandwidth of transmission spectra ranging from a few KHz to 20 GHz.

7. The fiber-based ring cavity tunable laser of claim 1 wherein:

said periodic filter having a bandwidth approximating a line-width of said fiber-based ring cavity tunable laser.

8. The fiber-based ring cavity tunable laser of claim 1 wherein:

said periodic filter having a spectral range of 10 GHz to 500 GHz.

9. The fiber-based ring cavity tunable laser of claim 1 wherein:

said periodic filter comprising a fiber cavity.

10. The fiber-based ring cavity tunable laser of claim 1 wherein:

said periodic filter comprising a fiber cavity in an erbium-doped fiber.

11. The fiber-based ring cavity tunable laser of claim 1 wherein:

said high-reflection coating disposed on both end surfaces of said periodic filter comprising a reflection coating with an approximately 0.9 reflectance.

12. The fiber-based ring cavity tunable laser of claim 1 wherein:

said periodic filter comprising said fiber segment wrapped by said gold coating is a heat-treated fiber segment for adjusting an refractive index for tuning a filtering spectrum.

13. The fiber-based ring cavity tunable laser of claim 1 wherein:

said periodic filter comprising a fiber-cavity having a fiber length ranging from a few millimeters to a few meters.

14. The fiber-based ring cavity tunable laser of claim 1 wherein:

said optical tunable filter (OTF) is an electrically tunable optical filter.

15. The fiber-based ring cavity tunable laser of claim 1 wherein:

said optical tunable filter (OTF) is an acoustically tunable optical filter.

16. The fiber-based ring cavity tunable laser of claim 1 wherein:

said optical tunable filter (OTF) is an Fabry-Perot tunable optical filter.

17. The fiber-based ring cavity tunable laser of claim 1 wherein:

said optical tunable filter (OTF) is a filter manufactured by a micro electromechanical (MEM) process.

18. The fiber-based ring cavity tunable laser of claim 1 wherein:

said optical tunable filter (OTF) comprising a PZT actuator.

19. The fiber-based ring cavity tunable laser of claim 1 wherein:

said optical tunable filter (OTF) comprising a refraction-index tunable liquid crystal.

20. The fiber-based ring cavity tunable laser of claim 1 wherein:

said optical tunable filter (OTF) comprising a acoustic tunable tellurium dioxide.

21. The fiber-based ring cavity tunable laser of claim 1 wherein:

said optical tunable filter (OTF) comprising a acoustic tunable tellurium dioxide and an radio frequency (RF) driven transducer.

22. The fiber-based ring cavity tunable laser of claim 1 wherein:

said optical tunable filter (OTF) having a tunable speed ranging between one-hundred milliseconds (100 ms) to one-tenth millisecond (0.1 ms).

23. The fiber-based ring cavity tunable laser of claim 1 further comprising:

a fiber-based ring constituting a dispersion managed cavity.

24. The fiber-based ring cavity tunable laser of claim 1 further comprising:

a fiber-based ring comprising a erbium-doped dispersion compensation fiber (DCF).

25. The fiber-based ring cavity tunable laser of claim 1 further comprising:

a fiber-based ring comprising a dispersion compensation fiber (DCF) having a first segment connected to a first end of said OTF and a second segment connected to a second end of said OTF opposite said first end of said OTF wherein said first segment and second segment having different lengths for reducing a group delay difference of an optical transmission.

26. The fiber-based ring cavity tunable laser of claim 1 wherein:

an thulium-doped fiber (TDF) as a gain medium constituting a fiber-based ring.

27. The fiber-based ring cavity tunable laser of claim 1 further comprising:

a fiber-based ring comprising a dispersion compensation fiber (DCF) and a PZT actuator for adjusting a length of said DCF for reducing a group delay difference of an optical transmission.

28. The fiber-based ring cavity tunable laser of claim 1 further comprising:

a fiber-based ring comprising a dispersion compensation fiber (DCF) having a first segment connected to a first end of said OTF and a second segment connected to a second end of said OTF opposite said first end of said OTF wherein said first segment and second segment having different lengths for reducing a group delay difference of an optical transmission; and said first segment having a first longitudinal axis and second segment having a second longitudinal axis wherein said first and second longitudinal axes are oriented with an angular difference.

29. The fiber-based ring cavity tunable laser of claim 1 further comprising:

a fiber-based ring comprising at least a first and a second segments wherein said first segment having a first longitudinal axis and second segment having a second longitudinal axis wherein said first and second longitudinal axes are oriented with an angular difference.

30. The fiber-based ring cavity tunable laser of claim 1 further comprising:

a Pr-doped (PDF) transmission optical fiber constituting a fiber-based ring.

31. The fiber-based ring cavity tunable laser of claim 1 further comprising:

a fiber-based ring comprising at least a first and a second segments wherein said first segment having a first longitudinal axis and second segment having a second longitudinal axis wherein said first and second longitudinal axes are oriented with an angular difference of ninety degrees.

* * * * *

UNITED STATES PATENT AND TRADEMARK OFFICE

CERTIFICATE OF CORRECTION

PATENT NO. : 6,937,627 B2
DATED : August 30, 2005
INVENTOR(S) : Jian Liu

It is certified that error appears in the above-identified patent and that said Letters Patent is hereby corrected as shown below:

Title page,
Item [76], Inventor, "Lin", should be corrected to -- Liu --.

Signed and Sealed this

Sixth Day of December, 2005

JON W. DUDAS
*Director of the United States Patent and Trademark Office*